US006443419B1

(12) United States Patent
Potma

(10) Patent No.: US 6,443,419 B1
(45) Date of Patent: Sep. 3, 2002

(54) FAST WORKING HYDRAULIC VALVE

(75) Inventor: Theodorus Gerhardus Potma, Zutphen (NL)

(73) Assignee: T. Potma Beheer, B.V. (NL)

( * ) Notice: Subject to any disclaimer, the term of this patent is extended or adjusted under 35 U.S.C. 154(b) by 0 days.

(21) Appl. No.: 09/743,553

(22) PCT Filed: Jul. 5, 1999

(86) PCT No.: PCT/NL99/00421

§ 371 (c)(1),
(2), (4) Date: Jan. 5, 2001

(87) PCT Pub. No.: WO00/01953

PCT Pub. Date: Jan. 13, 2000

(30) Foreign Application Priority Data

Jul. 6, 1998 (NL) ............................................ 1009564

(51) Int. Cl.[7] ................................................ F16K 1/44
(52) U.S. Cl. ........................................................ 251/26
(58) Field of Search ..................................... 251/25, 26

(56) References Cited

U.S. PATENT DOCUMENTS

| | | | | |
|---|---|---|---|---|
| 2,935,972 A | * | 5/1960 | Hard af Segerstad | 251/25 X |
| 3,175,581 A | | 3/1965 | Brandenberg | |
| 3,212,710 A | * | 10/1965 | Nilles | 251/26 X |
| 3,393,699 A | * | 7/1968 | Feldman | 251/26 X |
| 3,563,135 A | | 2/1971 | Trader et al. | |
| 3,743,237 A | * | 7/1973 | Kiser | 251/25 |
| 5,114,115 A | * | 5/1992 | Gillott | 251/26 X |
| 5,385,170 A | | 1/1995 | Tonhaeuser et al. | |
| 5,520,206 A | * | 5/1996 | Deville | 251/26 X |
| 5,758,862 A | * | 6/1998 | Sturman | 251/25 |

FOREIGN PATENT DOCUMENTS

| | | |
|---|---|---|
| EP | 0129665 | 1/1985 |
| WO | WO96/03575 | 2/1996 |

OTHER PUBLICATIONS

International Search Report for PCT/NL99/00421, Nov. 19, 1999.

* cited by examiner

*Primary Examiner*—Henry C. Yuen
*Assistant Examiner*—Eric Keasel
(74) *Attorney, Agent, or Firm*—Williams, Morgan & Amerson

(57) ABSTRACT

The invention relates to a quick switching hydraulic valve (7, 8) which opens or can be kept closed using an electric signal of low energy and which can switch very quickly with large passage. Regarding the known valves the switching valve according to the invention has the advantage that a tight embodiment with a very simple construction is possible and that spontaneous opening or spontaneous closing cannot occur in actual circumstances. Additionally the switching as regards timing is less critical and leakage via the controlling auxiliary valves (1, 2) or via internal leakage connections does not occur.

9 Claims, 1 Drawing Sheet

FAST WORKING HYDRAULIC VALVE

BACKGROUND OF THE INVENTION

The invention relates to a hydraulic switching valve which can open very fast from the closed position using a usual electric signal of very low energy.

Valves with these characteristics are known from the patent applications PCT/NL 96/00157 dated Apr. 10, 1996 and PCT/NL 95/00260 dated Jul. 27, 1995.

The application mentioned first is about a valve operated by a so-called adjusting piston which can move the valve body very fast after an electrical signal of low energy. Together with the adjusting cylinder the adjusting piston forms a first and a second displacement chamber in which in the first position the first and the second displacement chambers are connected to low pressure. From said first position the adjusting piston, apart from the spring force present, can move freely but after a small initial movement the first displacement chamber is connected by the adjusting piston to the high pressure Ph and as a result moves to the second position. The adjusting piston can drive a large variety of valve types with an almost unlimited number of switching functions. In case a simple on-off valve is driven a fast-working hydraulic switching valve is created. A drawback of said valve remains that through the gap sealings of the adjusting piston leakage occurs from the main supply with high pressure Ph, so that a tight hydraulic switching valve cannot be realized in this manner. In some of the known embodiments a relatively heavy valve spring is also necessary to keep the operated valve closed.

In PCT/NL95/00260 the valve body has two sealing edges, which with the valve casing in the closed position, form three chambers, the first chamber at all times being connected to the high supply pressure Ph, the second chamber in the closed position also being connected to the high pressure supply Ph, and the third chamber to the exit of the valve with exit pressure Pu. This outgoing pressure Pu can in principle be between Ph and the low system pressure Pl.

As a result of the in and outgoing pressure only, the valve will open spontaneously but can be kept in the closed position by high pressure Ph in the second chamber which is active on the second surface of the valve body which surface is larger than the first surface of the valve body in the first chamber on which the high pressure Ph is active.

The valve will open as soon as the second chamber is connected to low pressure Pl via switching means present. Because only very little liquid transport is needed to let the pressure drop sufficiently in the second chamber, it is about switching means of small passage which as a result can very quickly react to an electrical signal of low energy. As soon as the pressure in the second pressure chamber has dropped sufficiently the valve will open under influence of the pressure Ph on the first surface of the valve body.

A drawback of the valve from PCT/NL95/00260 is that the two seat sealings of the valve body in case of the intended tight embodiment have to close at exactly the same time and to that end have to comply with very high mechanic processing tolerances. In order to solve this problem the valve body in the preferred embodiment is built up from two parts that can move with respect to each other which parts are separated from each other via a gap sealing. This embodiment however increases the complexity, reduces the opening force (because a permanently active closing force under influence of the high pressure is created) and a leakage gap is created between the two valve parts.

A second drawback is that after opening a connection has been created between the high pressure supply and the low pressure Pl via the opened and electrically operated switching valve with which the second chamber is connected to low pressure. The period of time during which this electro valve has to remain opened is critical because for a switch of the hydraulic switching valve which is reliable and safe to operate, a certain minimal opening time is needed whereas on the other hand an opening time which is as short as possible is desired in order to prevent too much leakage loss via the opened electro valve to level Pl.

A third drawback of said switching valve is that it may close spontaneously for a longer or shorter period of time after a short pressure rise in the outgoing pipe to the level Ph. Such a pressure rise can easily arise by the closing of a present intermediate valve further down the outgoing pipe to for instance the hydro cylinder to be operated or by an occurring load of said cylinder. Because of the high pressure in the outgoing pipe pressure balance is created in the valve casing as a result of which the spring force will close the valve. When subsequently the load of the connected cylinder fails again or the intermediate valve is opened, Pu will drop fast and as a result the situation with high pressure in the first and second chamber and low pressure in the third chamber is created, and these are the same conditions which are maintained in the closed position using the electro valves in order to keep the valve closed.

In view of safety a drawback in some uses of this valve can also be the fact that the valve will open immediately when through unforeseen causes the high control pressure in the second chamber would fail for a moment. Without said control pressure in the second chamber commanded by the electro valves the valve acts as a non-return valve which spontaneously and immediately opens when there is pressure on the entrance of the valve.

The object of the invention is to provide an alternative for the fast-working hydraulic switching valve with which also the occurring drawbacks of the known switching valves can be prevented.

With regard to the valves moved by an adjusting piston described in PCT/NL96/00157 the hydraulic switching valve according to the invention distinguishes itself by the lack of the adjusting piston.

With regard to the valve from PCT/NL095/00260 described above, the valve according to the invention distinguishes itself because in the known configuration of valve and valve body the connections of the valve casing are changed in that sense that the third pressure chamber is at all times connected to the entrance 16 of the valve with high pressure Ph instead of with the exit pressure Pu, whereas in the closed position the first chamber is connected to low pressure instead of the high pressure Ph. Additionally in all embodiments switching means are present which can connect the first instead of the second chamber with high or low pressure. The design and dimensioning of the valve body here differ among others because the first surface 9*c* is larger than the second surface 10*c* instead of the other way round. The valve according to the invention further has two main embodiments.

In the first embodiment of FIG. 1 the second chamber 10 is permanently connected to the exit 17 of the valve with pressure Pu.

In the second embodiment the first chamber 9 is at all times connected to the exit 17 of the valve with pressure Pu and the second chamber 10 is at all times connected to the low pressure Ps2, the second sealing edge being designed as a gap sealing 10*b* to which tight seat sealing 10*a* is added. The embodiment being such that the gap sealing 10*b* seals permanently between the second and the third chamber 10 and 11.

In the new switching valve which is created in this way the drawbacks mentioned do not occur, which is elucidated in short below.

The leakage losses via the adjusting piston do not occur because the adjusting piston is not there. A very light valve spring is at all times sufficient here because in all cases the switching valve can be kept safely in the closed position even without spring force.

The leakage losses via the electric switching valve 1 to Pl do not occur because switching takes place from Pl to Ph takes place. The switching period therefore is no longer critical.

There is no possibility of a spontaneous closing of the hydraulic switching valve because in the first embodiment according to FIG. 1, from the position of pressure balance between Ph and Pu and a valve closed by the spring force, when the pressure Pu fails the closing force also fails which is exerted by the pressure Pu on the second surface 10*c* of the valve body. The failing of said closing force therefore means in this case that the resulting opening force on the valve body increases, as a result of which an unwanted spontaneous closing cannot occur.

In the embodiment according to FIG. 2 spontaneous closing does not occur either because for the closing the pressure Ps2 first has to become higher than the pressure in the entrance pipe 16 and this condition cannot spontaneously occur.

The measures as well which are described in PCT/NL95/00260 to realize a simultaneous tight closing of the seat sealings are not necessary in the hydraulic switching valve according to the invention. Instead the valve body is dimensioned such that it deforms elastically under influence of the pressure Ph in the third chamber on the valve body as a result of which both sealing edges will seal tightly.

The valve according to the invention is furthermore intrinsically safe because no pressure is needed in the first chamber to keep the valve closed. Also when the control pressure Ps fails or even when the valve spring breaks the valve according to the invention is still kept firmly closed under influence of the high entrance pressure Ph on the valve part 7*a*.

Characterizing for the hydraulic switching valve according to the invention is that switching means (1 and 2) are present to connect the first chamber (9) to high or low pressure (Ph or Ps), said first chamber (9) in the closed position of the valve being connected to low pressure (Pl) and the third chamber (11) at all times being connected to the high entrance pressure (Ph) whereas the first surface (9*c* ) of the valve body is larger than or equal to the second surface (10*c*).

BRIEF DESCRIPTION OF THE DRAWINGS

The invention is described below on the basis of FIG. 1, which figure shows a characteristic first embodiment and on the basis of FIG. 2 which shows a characteristic second embodiment.

DETAILED DESCRIPTION OF THE INVENTION

Figure 1:
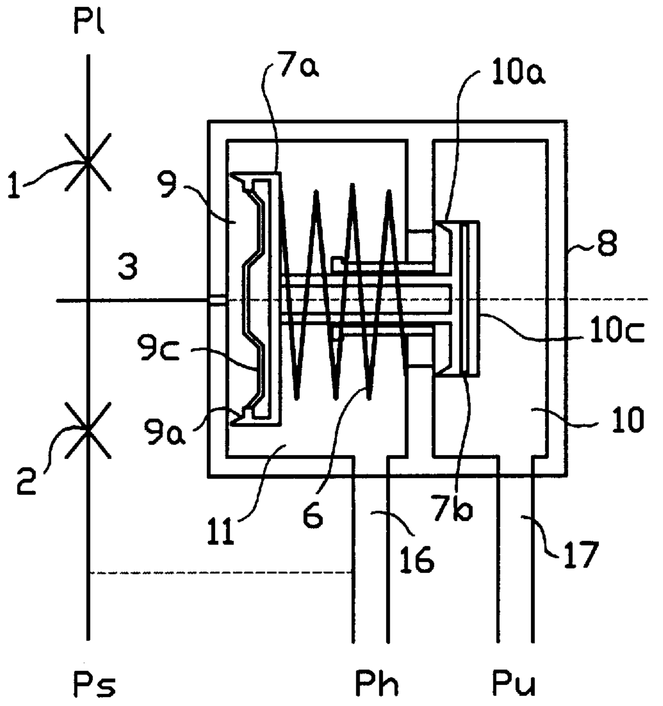

In FIG. 1, 8 is the valve casing in which the valve body 7*a*, 7*b* moves between the indicated closed position and the position in which the valve is entirely opened. The valve body here consists of two parts 7*a* and 7*b* which are connected to each other by a guiding rod. Under influence of the valve spring 6 the valve body will experience a force towards the closed position. The first and second sealing edge 9*a* and 10*a* of the valve body close with a tight seat sealing against the valve casing and as a result in the closed position form three chambers 9, 10 and 11. The first sealing edge 9*a* seals between the first chamber 9 and the third chamber 11. The second sealing edge seals between the second chamber 10 and the third chamber 11. The pressure in the first chamber 9 is exerted on the first surface 9*c* of the valve body whereas the surface 10*c* experiences the pressure in the second chamber 10. Furthermore the first chamber 9 in the closed position is connected to low pressure Pl via auxiliary valve 1 which is an in general electrically operated valve with a small passage and as a result a very high switching speed. The pressure Pl is a low system pressure. The first chamber 9 can be connected to the pressure Ps or Pl with the switching means 1 and 2, Ps being a pressure level between the low system pressure Pl and the high system pressure Ph. In general Ps is equal to Ph.

The second chamber 10 is permanently connected to the exit 17 of the hydraulic switching valve with pressure Pu which may have values ranging between Pl and Ph. The third chamber 11 is permanently connected to the valve entrance 16 with high system pressure Ph.

The working of the valve is as follows. In the closed position the first chamber 9 is connected to low pressure Pl via auxiliary valve 1, auxiliary valve 2 being closed. In the third chamber 11 the pressure Ph prevails which exerts a closing force on the valve part 7*a* and an opening force on the valve part 7*b*. Because the first surface 9*c*. is larger than the second surface 10*c* the closing force is larger than the opening force so that under influence of the pressure in the third chamber 11 a resulting closing force is exerted on the valve body.

With low pressure Pl in the first and second chamber 9 and 10 no resulting force is exerted in the opening direction on the valve body via the first and second surface 9*c* and 10*c*, so that the hydraulic switching valve remains closed.

With pressure Ps in the first chamber 9 as a result of closing the auxiliary valve 1 and opening auxiliary valve 2 an opening force will be exerted on the valve body via the first surface 9*c* as a result of which the valve opens.

As a result of opening, the pressure on the first surface 9*c* rises to the level Ph and the valve will open further.

The pressure Ps is higher than Pl and generally equal to Ph. For opening it is also necessary that Ps is high enough to overcome the closing force which is created as a result of the pressure Pu on the second surface 10*c*.

When Ps is lower than Ph it is desirable to accommodate a non-return valve between auxiliary valve 2 and the pressure source Ps in order to prevent that when the valve is opened liquid will flow from the third chamber with pressure Ph to the pressure source with the lower pressure Ps.

When after opening the valve pressure balance is created between Ph and Pu the valve will close under influence of the valve spring 6. In case Pu would subsequently drop quickly the valve will open in an accelerated manner because the closing force via the second surface 10*c* would also decrease fast as a result of which a resulting opening force is created.

From the situation with pressure balance between Ph and Pu and a valve closed by the valve spring, the valve can be kept in the closed position by closing the auxiliary valve 2 and opening the auxiliary valve 1 as a result of this the pressure in the first chamber 9 drops and the initial situation is reached again.

In case the valve exit 17 would be connected to high pressure and the valve entrance 16 is connected to low pressure the valve will close immediately as a result of the pressure difference over the valve part 7*b* and the closing force resulting from it.

The auxiliary valves 1 and 2 generally are quick switching electro valves with small passage. Auxiliary valve 1 can also be a pressure switched valve which closes above a certain low pressure value in pipe 3 and opens as long as and as soon as the pressure in pipe 3 drops below that threshold value.

In order to achieve a tightly sealing hydraulic switching valve it is necessary for the two sealing edges with the seat sealings 9*a* and 10*a* both close at the same time. This requires exceptional accurate mechanic processing tolerances of valve and valve casing. In order to avoid these precise tolerances in the switching valve according to the invention the valve body is processed such that when the valve is closed and the valve casing is pressure-less, one of the sealing edges 9*a* or 10*a* does not close. The valve part 7*a* here is a relatively bend weak plate which under influence of the pressure Ph in the third pressure chamber will bend until both sealing seats close. In the preferred embodiment the valve body is processed such that the first sealing edge 9*a* closes first after which under influence of the pressure Ph in the third chamber 11 the intermediate part of the disc-shaped valve part 7*a* bends to the left as a result of which valve part 7*b* is pulled to the left by the connection rod and the second sealing edge 10*a* will also close. When the design of the valve body is such that the second sealing seat 10*a* closes first, then under influence of the pressure Ph in the third chamber the outer edge of the disc-shaped valve part 7*a* will bend to the left as a result of which also the first sealing seat 9*a* will close.

Another manner to get a tight sealing is to replace one of the seat sealings by an o-ring sealing which allows some variation in the gap height or by an elastic metal lip sealing in which the metal lip under influence of the pressure in the third pressure chamber seals.

Figure 2:
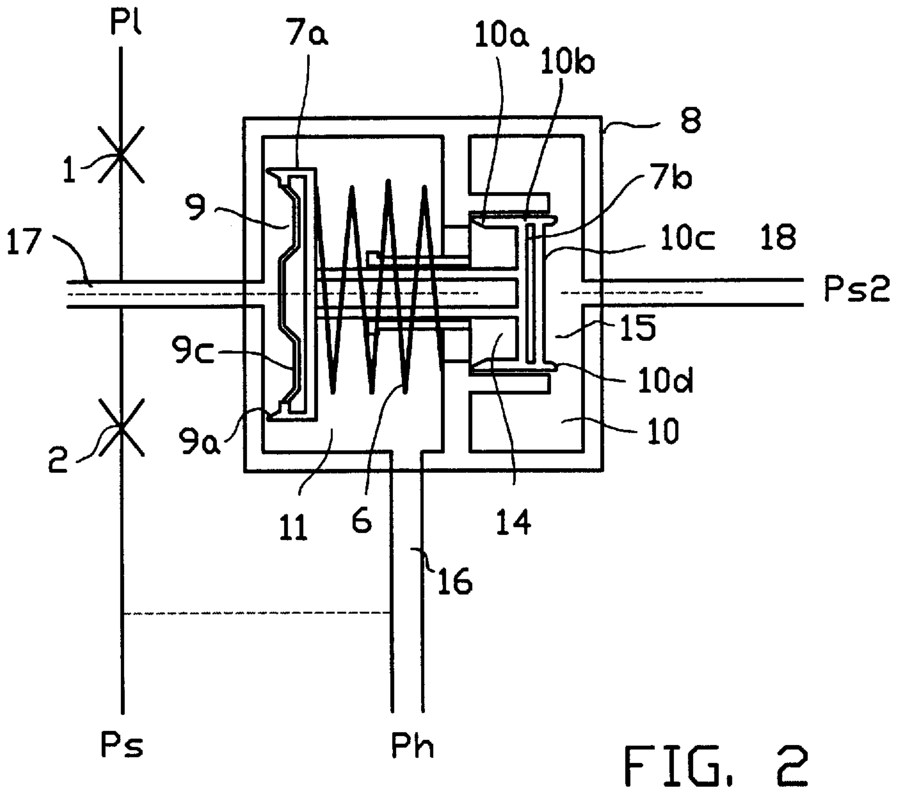

FIG. 2 shows a large resemblance to FIG. 1. One difference being that the second sealing edge 10*a, b* and *d* forms two seat sealings 10*a* and 10*d* and a gap sealing 10*b* with the valve casing 8. The gap sealing 10*b* with the valve casing is permanent, as a result of which the valve part 7*b* will in fact function as a piston in a cylinder with two displacement chambers 14 and 15. The function of the piston is to exert a permanent opening force on the valve body and to that end the first displacement chamber 14 is permanently connected to the high pressure Ph and the second displacement chamber 15 is permanently connected to the low control pressure Ps2 which is predominantly similar to the low system pressure Pl.

In this embodiment the first chamber 9 is permanently connected to the exit 17 with pressure Pu.

The valve part 7*b* is also provided with a second seat edge 10*d* with which in the entirely opened right position the broad pipe 18 to pressure level Ps2 is closed off.

The working of the hydraulic switching valve is as follows. In the closed position the valve body is kept closed under influence of the pressure Ph in the third chamber 11 on the valve part 7*a*. The closing force which arises as a result is larger than the permanent opening force which arises as a result of the high pressure Ph in the chamber 14 which is exerted on the valve part 7*b*. The valve is opened by allowing the high control pressure Ps to the first chamber 9 via auxiliary valve 2 in a manner as described with FIG. 1. The control pressure Ps should in any case be high enough to overcome the closing force on valve part 7*b* as a result of the pressure Ps2. In general Ps is equal to Ph and Ps2 is equal to the low pressure Pl.

In case of a completely opened valve leakage to the pressure level Ps2 is prevented because the seat edge 10*d* seals against the valve casing 8 and with that completely closes off pipe 18.

In case of a closed valve a tight closing is achieved by elastic deformation of the valve body under influence of the pressure Ph in the third chamber 11 in the manner described with FIG. 1. Also the use of said o-ring or the metallic sealing is possible here preferably on the location of the seat sealing 9*a*.

For a good working of this embodiment it is necessary that when the valve is closed pressure build-up in the discharge pipe 17 of the valve is possible.

The practical difference between embodiment 1 and embodiment 2 particularly is that in embodiment 2 flow in two directions through the switching valve is possible because when there is pressure balance between Ph and Pu the valve remains opened whereas in the embodiment according to FIG. 1 the valve will in that case move to the left closing position. In order to definitively close embodiment 1, taking an existing pressure balance between entrance and exit 16 and 17 as starting point, the first pressure chamber 9 is connected to low pressure via the auxiliary valves 1 and 2. In order to definitively close embodiment 2 it should first be effected that Ps2 becomes higher than the pressure in pipe 16 and 17 as a result of which the valve moves to the left closing position, after which the first chamber is connected to low pressure with the auxiliary valves 1 and 2.

The practical difference between the two embodiments for instance manifests itself when the quick hydraulic switching valve according to the invention is used for the starting of a free piston engine of the type as described in the two patent applications mentioned earlier.

In case embodiment 1 is used the pressure Pca is connected to the valve entrance 16 and the pressure Pcc is connected to pipe 17. The switching valve will then close during the expansion stroke of the free piston as soon as Pcc becomes higher than Pca.

In case embodiment 2 is used the pressure Pca is again connected to pipe 16 and Pcc to pipe 17, but pipe 18 is now connected to the pressure Pac in the operating cylinder. The switching valve will now close during the expansion stroke as soon as Pac becomes higher than Pca in which the closing can be slowed down by connecting Pac via a non-return valve to pipe 18 and to bridge said non-return valve by a restriction. When closing the liquid from chamber 15 should then flow through the restriction as a result of which the closing of the switching valve can be slowed down with the advantage that also during the first part of the expansion stroke of the free piston flow can take place from the hydraulic compression cylinder to the compression accumulator.

Furthermore it applies for both embodiments that the auxiliary valve 1 could be left out under certain circumstances. This situation occurs when already from the first chamber a certain leakage to low pressure is always present or when the hydraulic switching valve needs to be closed for such a short period of time that the pressure in the first chamber in that short period of time cannot rise high enough to open the switching valve early as a result of leakage via the first sealing edge 9*a*.

What is claimed is:

1. Hydraulic switching valve, comprising a valve casing within it a valve body movable between an opened and closed position, and generally experiencing a permanent spring force in the direction of the closed position, the high pressure level prevailing at the entrance of the valve and the exit pressure prevailing at the exit which pressure has a value between the low system pressure and the high pressure, the valve body having a first sealing edge and a second sealing edge and with it in the closed position of the valve forming three adjacent chambers with the valve casing, the first sealing edge only sealing in the closed position, between the first chamber and the third chamber, and the second sealing edge sealing between the third chamber and the second chamber, the valve body having a first surface on which pressure is exercised in the first chamber which pressure causes a force in the direction of the opened position and a second surface on which in the closed position the pressure is exerted in the second pressure chamber as a result of which a force is caused in the direction of the closed position, characterized by switching valves to selectively and respectively connect the first chamber to high and low pressure, wherein in the closed position the first chamber is connected to low pressure whereas the third chamber is at all times connected to the valve entrance for the high entry pressure and wherein the first surface of the valve body is lager or equal to the second surface.

2. Hydraulic switching valve according to claim 1, characterized in that the first chamber is at all times connected to an outgoing pipe and the second chamber is at all times except in the case of the entirely opened position of the valve connected to the valve entrance for a pressure which is lower than the high pressure level, the second sealing edge sealing permanently against the valve casing with a gap sealing, wherein the second sealing edge is also provided with a second seat sealing which seals he valve entrance for the pressure when the valve is completely opened.

3. Hydraulic switching valve according to claim 1, characterized in that the second chamber is at all times connected to the exit of the switching valve with pressure.

4. Hydraulic switching valve according to claim 1, characterized in that the first chamber is at all times connected to the exit and the second chamber is at all times connected to the valve entrance for a pressure which is lower than the high pressure level, the second sealing edge sealing permanently against the valve casing with a gap sealing.

5. Hydraulic switching valve according to claim 4, characterized in that the second sealing edge is also provided with a first seat sealing which in the closed position of the valve seals against the valve casing.

6. Hydraulic switching valve according to claim 1, wherein the first sealing edge is a seat seal.

7. Hydraulic switching valve according to claim 6, characterized in that the valve body is dimensioned such that in the closed position when there is pressure balance in the valve casing only the seat sealing of the first sealing edge or the first seat sealing of the second sealing edge seals, the valve body also being designed such that as a result of elastic deformation of the valve body under the influence of the high supply pressure in the third chamber both seat seals close.

8. Hydraulic switching valve according to claim 7, characterized in that the valve body consists of a first disc-shaped or plate-shaped pan and a second disc or plate-shaped part which are connected through a Connection rod, at least one of the parts being bend weak to such an extent that in the closed position under influence of the high supply pressure in the third pressure chamber it will bend to such an extent that both seat scalings will be closed.

9. Hydraulic switching valve according to claim 1, characterized in the seat of the first sealing edge or the first seat of the second sealing edge has been replaced by an o-ring sealing or an elastic and a metallic sealing which seals under influence of the pressure in the third chamber in the closed position.

* * * * *

UNITED STATES PATENT AND TRADEMARK OFFICE

CERTIFICATE OF CORRECTION

PATENT NO. : 6,443,419 B1
DATED : September 3, 2002
INVENTOR(S) : Theodorus Gerhardus Potma It is certified that error appears in the above-identified patent and that said Letters Patent is hereby corrected as shown below:

Column 8,
Line 24, cancel the word "pan" and insert -- part -- in its place.
Line 29, cancel the word "scalings" and insert -- sealings -- in its place.

Signed and Sealed this

Thirty-first Day of December, 2002

JAMES E. ROGAN
*Director of the United States Patent and Trademark Office*